United States Patent
Cattoor et al.

(10) Patent No.: US 12,351,017 B2
(45) Date of Patent: Jul. 8, 2025

(54) SYSTEMS AND METHOD FOR AN ELECTRIC POWERTRAIN

(71) Applicant: Dana Belgium N.V., Flanders (BE)

(72) Inventors: Kurt Cattoor, Koolkerke (BE); Filip D. Schacht, Meulebeke (BE); Filip Van Raepenbusch, Bruges (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/656,953

(22) Filed: May 7, 2024

(65) Prior Publication Data
US 2025/0033463 A1    Jan. 30, 2025

Related U.S. Application Data

(60) Provisional application No. 63/515,522, filed on Jul. 25, 2023.

(51) Int. Cl.
*B60K 17/08* (2006.01)
*B60K 1/02* (2006.01)
*B60K 17/344* (2006.01)

(52) U.S. Cl.
CPC ............. *B60K 17/08* (2013.01); *B60K 1/02* (2013.01); *B60K 17/344* (2013.01)

(58) Field of Classification Search
CPC ........ B60K 17/08; B60K 1/02; B60K 17/344; F16H 2200/006; F16H 2200/2048; F16H 2200/2041
See application file for complete search history.

(56) References Cited

U.S. PATENT DOCUMENTS

| | | | |
|---|---|---|---|
| 4,589,295 A | 5/1986 | Jerry et al. | |
| 6,955,627 B2 | 10/2005 | Thomas et al. | |
| 6,988,426 B2 * | 1/2006 | Calvert | F16H 3/093 74/331 |
| 9,062,761 B2 * | 6/2015 | Bremner | F16H 61/061 |
| 10,086,686 B2 | 10/2018 | Mueller et al. | |
| 10,670,124 B2 | 6/2020 | Rekow et al. | |
| 2015/0306955 A1 * | 10/2015 | Knoblauch | B60K 17/356 180/242 |
| 2018/0149247 A1 * | 5/2018 | Rekow | F16H 3/728 |
| 2019/0063556 A1 * | 2/2019 | Bulgrien | F16H 3/006 |
| 2019/0063557 A1 * | 2/2019 | Cattoor | F16H 3/093 |
| 2019/0346036 A1 * | 11/2019 | Ore | B60K 6/08 |
| 2021/0008979 A1 * | 1/2021 | Bindl | B60K 6/547 |

FOREIGN PATENT DOCUMENTS

WO    WO-2021098970 A1 *    5/2021    ......... F16H 61/0003

* cited by examiner

*Primary Examiner* — Farhana Pervin
(74) *Attorney, Agent, or Firm* — McCoy Russell LLP

(57) ABSTRACT

Systems are provided for a transmission system. In one example, a multi-speed transmission includes an input section comprising a plurality of input speed reduction gearsets, an intermediate section comprising a plurality of clutches and gears configured to generate different speeds, and an output section comprising a high clutch and a low clutch, wherein each of the sections is arranged in the transmission housing, wherein a layout of the sections is arranged in a short drop layout with a first distance between an input shaft of the input section and an output shaft of the output section or in a long drop layout with a second distance between the input shaft and the output shaft, wherein the second distance is greater than the first.

20 Claims, 6 Drawing Sheets

SYSTEMS AND METHOD FOR AN ELECTRIC POWERTRAIN

CROSS REFERENCE OT RELATED APPLICATION

The present application claims priority to U.S. Provisional Application No. 63/515,522, entitled "SYSTEMS AND METHOD FOR AN ELECTRIC POWERTRAIN", and filed on Jul. 25, 2023. The entire contents of the above-listed application are hereby incorporated by reference for all purposes.

TECHNICAL FIELD

The present description relates generally to a transmission of an electric powertrain of a vehicle.

BACKGROUND AND SUMMARY

As the proliferation of vehicle electrification continues, vehicle components are modified to accommodate new vehicle architectures. For example, transmissions may need multiple gear trains to accommodate torque transfer from one or more electric motors. Packaging of a multi-gear train transmission may present certain challenges as packaging space available in vehicles continues to be reduced.

Thus, a demand for a transmission with multiple gear trains and a reduced packaging size is desired. In one example, the issues described above may be addressed by a multi-speed transmission including an input section comprising a plurality of input speed reduction gearsets, an intermediate section comprising a plurality of clutches and gears configured to generate different speeds, and an output section comprising a high clutch and a low clutch, wherein each of the sections is arranged in the transmission housing, wherein a layout of the sections is arranged in a short drop layout with a first distance between an input shaft of the input section and an output shaft of the output section or in a long drop layout with a second distance between the input shaft and the output shaft, wherein the second distance is greater than the first.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The above, as well as other advantages of the present disclosure, will become readily apparent to those skilled in the art from the following detailed description when considered in light of the accompanying drawings in which.

DETAILED DESCRIPTION

Figure 1:
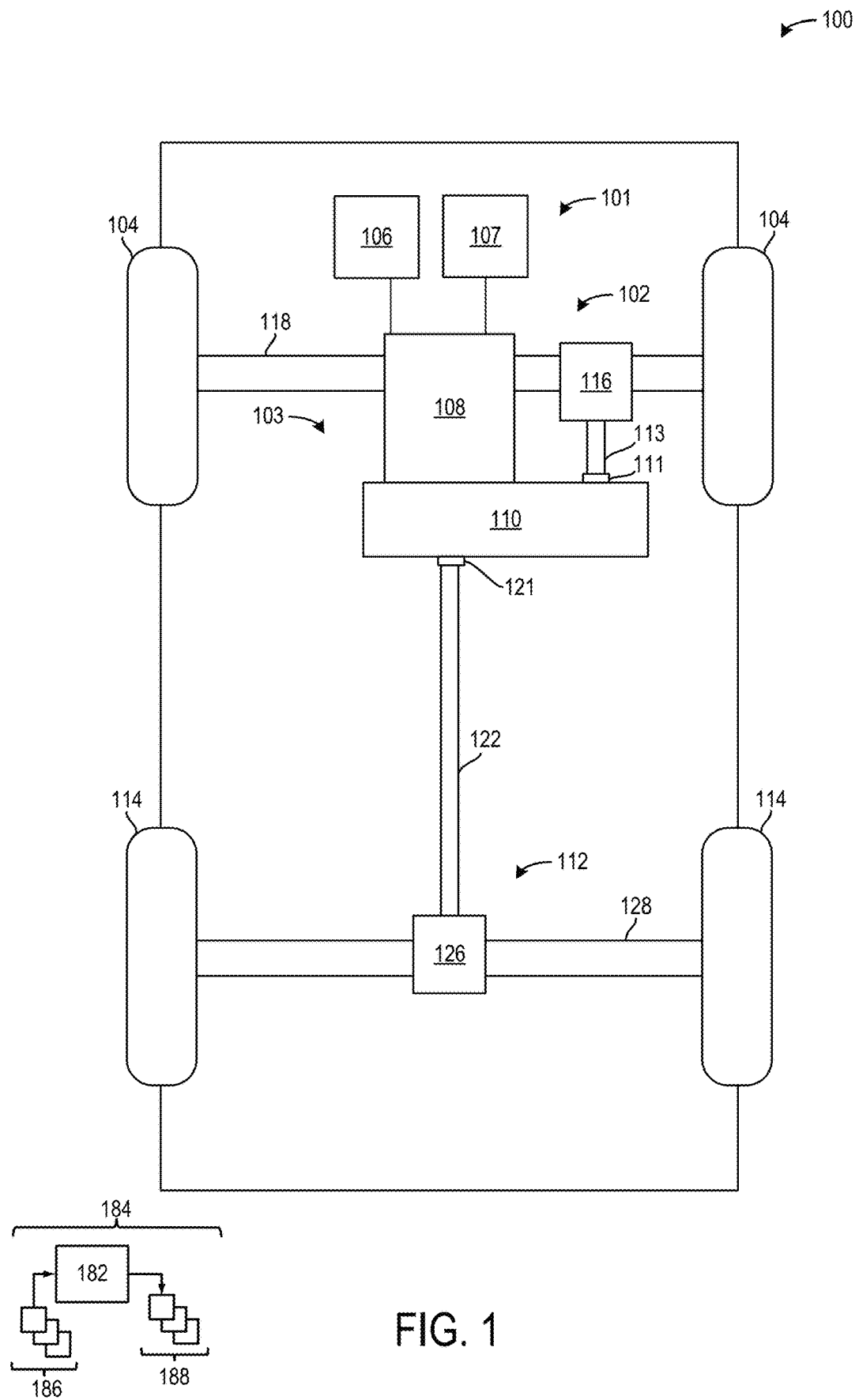
FIG. 1 is a schematic depiction of an example vehicle, according to an embodiment of the present disclosure.
Figure 2:
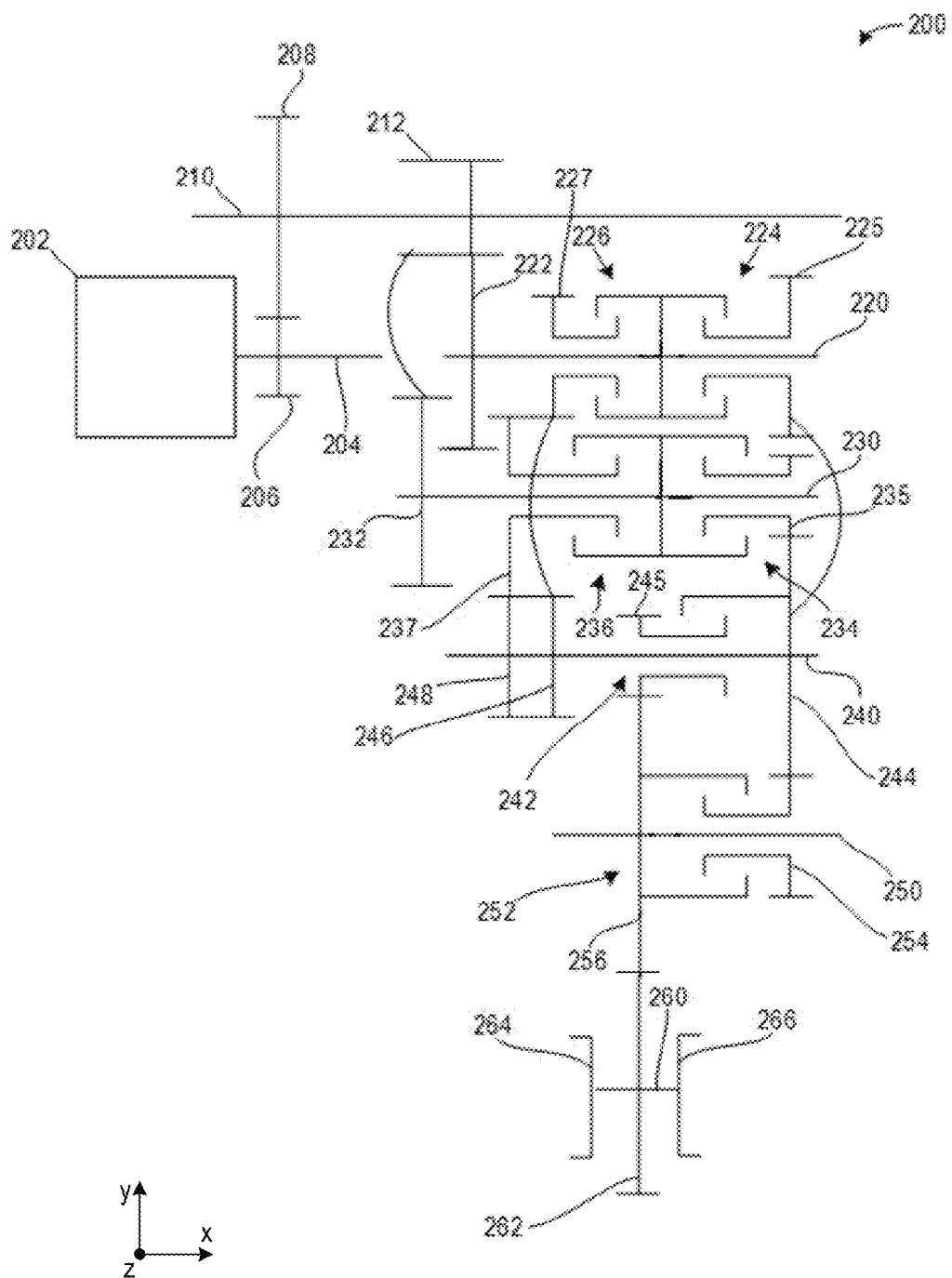
FIG. 2 is a first embodiment of a transmission of the vehicle, according to an embodiment of the present disclosure.
Figure 3:
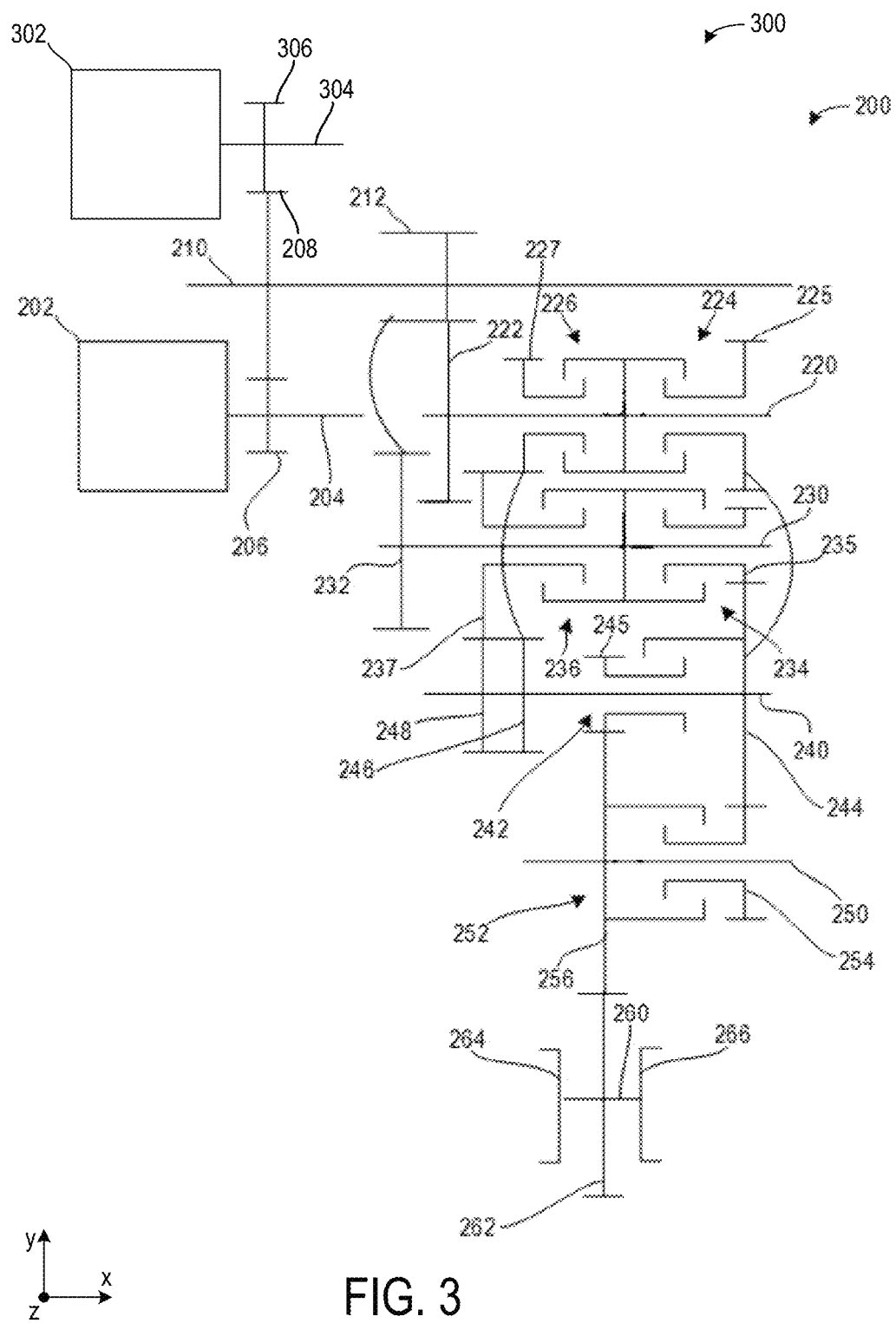
FIG. 3 is a second embodiment of the transmission of the vehicle, according to an embodiment of the present disclosure.
Figure 4:
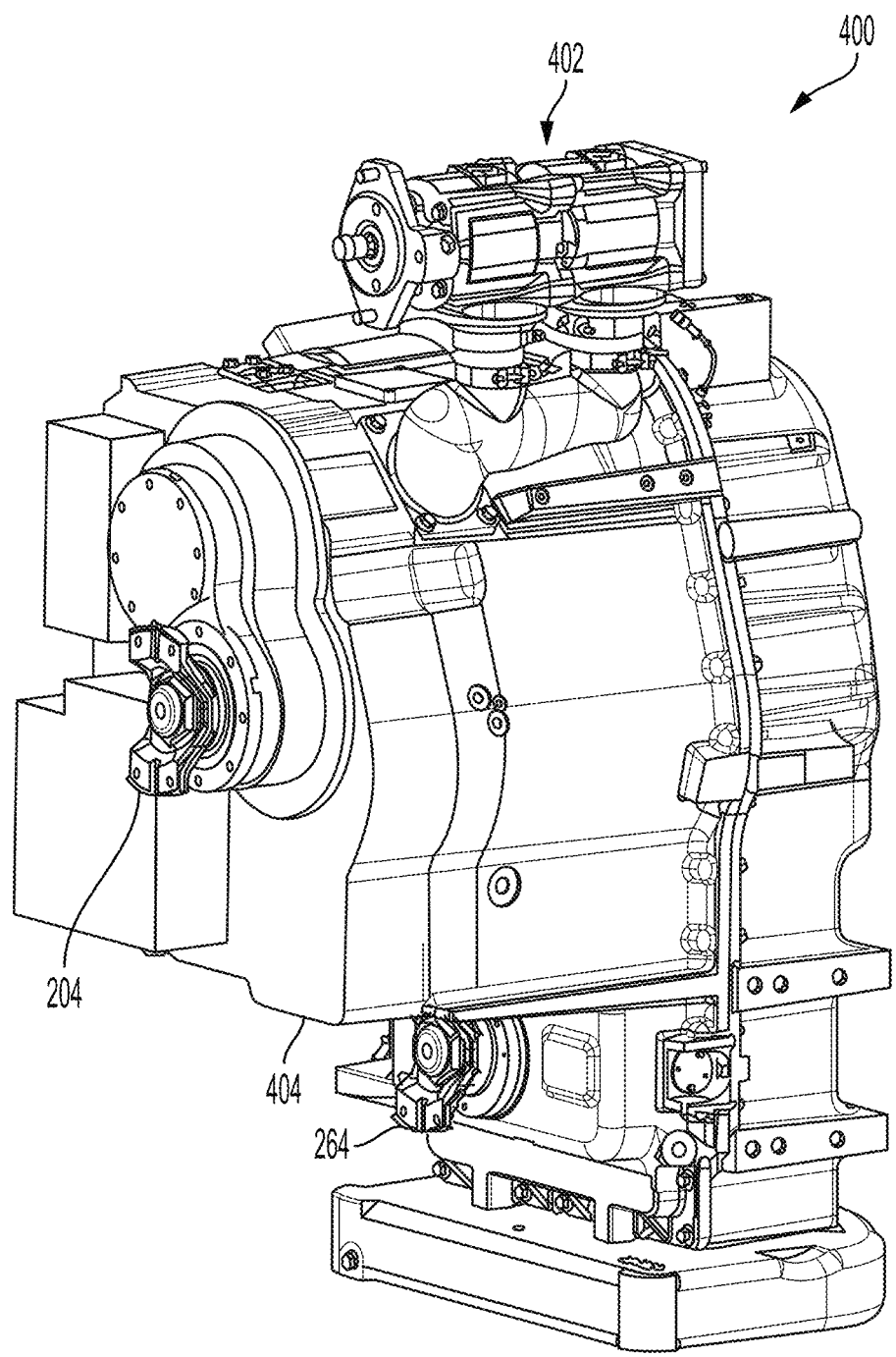
FIG. 4 is an embodiment of a housing of the transmission, according to an embodiment of the present disclosure.
Figure 5A:
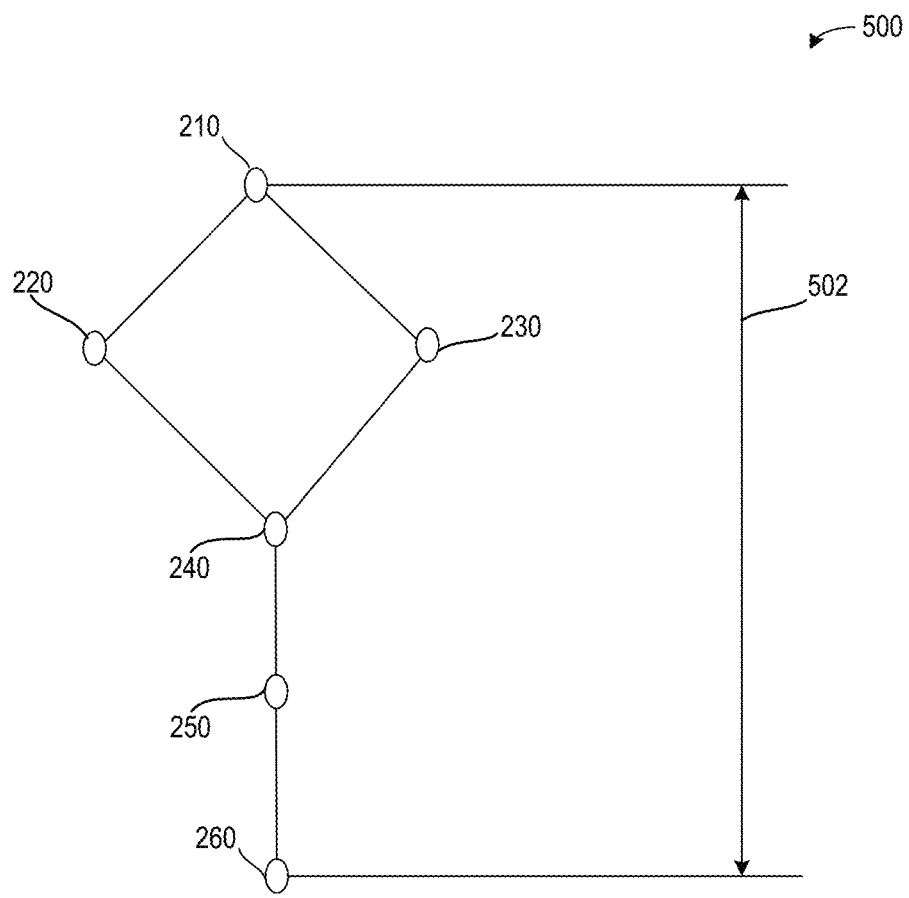
FIG. 5A is an embodiment of a first layout of the transmission, according to an embodiment of the present disclosure.
Figure 5A:
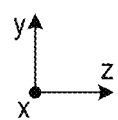
Figure 5B:
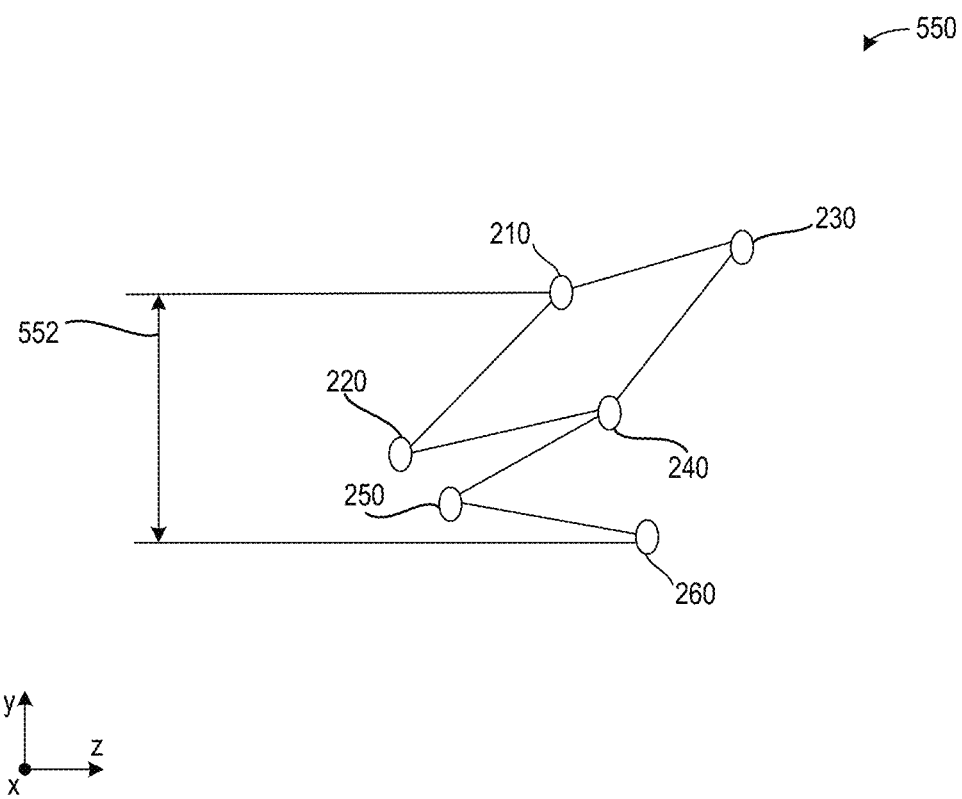
FIG. 5B is an embodiment of a second layout of the transmission, according to an embodiment of the present disclosure.

The following description relates to a transmission. In one example, the transmission is a multi-speed transmission, as shown in FIG. 1. FIG. 2 is a first embodiment of a transmission of the vehicle. FIG. 3 is a second embodiment of the transmission of the vehicle. FIG. 4 is an embodiment of a housing of the transmission. FIG. 5A is an embodiment of a first layout of the transmission. FIG. 5B is an embodiment of a second layout of the transmission, according to an embodiment of the present disclosure FIGS. 1-5B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation). FIG. 4 is shown approximately to scale.

In one example, the disclosure provides support for a transmission coupled to at least one electric motor. The transmission may be a multi-speed transmission comprising an equal number of forward and reverse driving gears. A high/low range shift at a transmission output reduces a gear spread in other sections of the transmission. By doing this, a range of gear sizing may be reduced such that the gears are sized more closely to one another (e.g., a tooth difference between gears is reduced) and lower gear/shaft speeds may be achieved. This may increase a longevity of the gears and shafts and decrease a packaging size of the transmission.

The transmission may be powered by at least one prime mover. The prime mover may be an electric machine or an internal combustion engine. In one example, the transmission is driven by exactly one electric machine. In some embodiments, the transmission may be modified to be driven by two electric machines without modifying a housing of the transmission.

In one example, the transmission is a countershaft powershift gearbox comprising of a plurality of shafts, gears, clutches, and bearings. The transmission may produce eight different speed ratios.

The transmission may include a first section, a second section, and a third section. The first section may include input speed reduction gear sets if the transmission receives power from an electric machine. The input speed reduction gear sets may be omitted or modified if an internal combustion engine supplies power to the transmission. In one example, the input speed reduction gear sets may reduce a bearing size used to support the gears and shafts as bearings experience lower speeds relative to a transmission without the input speed reduction gear sets.

The second section may include a plurality of clutches. In one example, the plurality of clutches provides four distinct speeds. The plurality of clutches may be arranged on two parallel shafts and each clutch may include an associated gear. In one example, each of the plurality of clutches is a wet clutch.

The third section may include a high range clutch and a low range clutch. These clutches may double the number of speeds, thus allowing the transmission to produce eight different speeds. The positioning of the high range and low range clutch may reduce the gear spread, thereby decreasing a packaging size of the transmission.

In this way, the present disclosure provides support for a transmission comprising a multi-speed layout with a reduced power load circulating through the transmission, thereby allowing smaller component sizes and increased component longevity. The transmission further comprises a housing configured to allow one or more prime movers to supply power to the components of the transmission. The housing further allows the transmission components arranged therein to be rearranged into a short drop configuration or a long drop configuration without modifying a configuration of the housing. As such, the transmission and its housing may be arranged in a variety of different vehicle powertrain architectures.

Turning now to FIG. 1, a vehicle 100 is shown comprising a powertrain 101 and a drivetrain 103. The powertrain comprises a prime mover 106 and a transmission 108. The prime mover 106 may be an internal combustion engine or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting.

In one example, the prime mover 106 is a first prime mover 106 and the vehicle 100 may further include a second prime mover 107. The first prime mover 106 may be different than the second prime mover 107. For example, the first prime mover 106 may be an electric machine and the second prime mover 107 may be an internal combustion engine. Additionally or alternatively, the first prime mover 106 and the second prime mover 107 may both be an electric motor or an internal combustion engine, however, a size and/or fuel source thereof may be different between the first and second prime movers. In some examples, additionally or alternatively, if one of the first prime mover 106 and the second prime mover 107 is an engine, the engine may be configured to combust multiple fuels including varying amounts of carbon and carbon-free fuels.

Each of the first prime mover 106 and the second prime mover 107 may be coupled to an energy storage device. The energy storage device may be a battery, a fuel tank, or other similar device. A charge of fuel volume of the energy storage device may be monitored via a sensor or estimated based on vehicle operating conditions. In one example, one or more of the first prime mover 106 and the second prime mover 107 may be configured to replenish a charge of the energy storage device during a generator operation. In one example, additionally or alternatively, the first prime mover 106 and the second prime mover 107 may be electric machines sized smaller than a single electric machine incorporated in a similarly configured powertrain.

The vehicle 100 may be a commercial vehicle, light, medium, or heavy duty vehicle, a passenger vehicle, an off-highway vehicle, and sport utility vehicle. Additionally or alternatively, the vehicle 100 and/or one or more of its components may be in industrial, locomotive, military, agricultural, and aerospace applications.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing.

In some examples, additionally or alternatively, the vehicle 100 may be a hybrid vehicle including both the engine and the electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

The vehicle 100 may further include a control system 184. Control system 184 is shown comprising a controller 182 receiving information from a plurality of sensors 186 and sending control signals to a plurality of actuators 188. The controller 182 may receive input data from the various sensors, process the input data, and trigger the actuators in response to the processed input data based on instruction or code programmed therein corresponding to one or more routines. The plurality of sensors 186 may include speed sensors, temperature sensors, humidity sensors, location sensors, accelerometers, and the like. The plurality of actuators 188 may be actuators of one more valves, motors, and other devices.

Turning now to FIG. 2, it shows a transmission assembly 200. The transmission assembly 200 may be included in vehicle 100 of FIG. 1. In one example, the transmission assembly 200 is a non-limiting example of the transmission 108 of FIG. 1. The transmission assembly 200 may be a multi-speed transmission. In one example, the transmission assembly 200 is a two-speed transmission.

An axis system is shown comprising an x-axis, a y-axis normal to the x-axis, and a z-axis normal to each of the x- and y-axes. In one example, the x-axis is parallel to a horizontal direction, the y-axis is parallel to a vertical axis, and the z-axis is parallel to a transverse direction.

A prime mover 202 comprises a prime mover shaft 204 on which a first prime mover shaft gear 206 is arranged. The first prime mover shaft gear 206 may be in meshed engagement with a first gear 208. In one example, the first prime mover shaft gear 206 may rotate based on a rotation of the prime mover shaft 204. The first prime mover shaft gear 206 may be physically coupled to the prime mover shaft 204 and include teeth that interlock with teeth of a first gear 208. The first gear 208 may rotate a first shaft 210 of the transmission assembly 200. In one example, the first prime mover shaft gear 206 and the first gear 208 are included in a first input speed reducing gear set.

A second gear 212 may be arranged on the first shaft 210. The second gear 212 may rotate as the first shaft 210 rotates. The second gear 212 may include teeth that mesh (e.g., interlock) with two different gears. The second gear 212 may couple to a third gear 222 and a fourth gear 232 arranged on separate shafts. In one example, a second input speed reducing gear set may include the second gear 212, the third gear 222, and the fourth gear 232. The first and second input speed reducing gear sets may decrease a load through the transmission assembly 200, which may decrease a demanded bearing and gear sizes, thereby decreasing a packaging size of the transmission assembly 200. That is to say, a rotational speed of the prime mover 202 may be reduced via the first and second input speed reducing gear sets The third gear 222 may be arranged on a second shaft 220. Rotation of the third gear 222 may result in rotation of the second shaft 220. A first clutch 224 and a third clutch 226 may be arranged on the second shaft 220. The first clutch 224 may include a first clutch gear 225 and the third clutch 226 may include a third clutch gear 227. The second shaft 220 may be parallel to the first shaft 210 and the prime mover shaft 204.

The fourth gear 232 may be arranged on a third shaft 230. The fourth gear 232 may be configured to rotate the third shaft 230. A second clutch 234 and a fourth clutch 236 may be arranged on the third shaft 230. The second clutch 234 may include a second clutch gear 235 and the fourth clutch 236 may include a fourth clutch gear 237. The third shaft 230 may be parallel to each of the second shaft 220, the first shaft 210, and the prime mover shaft 204.

In one example, the clutches may be activated or deactivated at different conditions to product different speeds. In one example, only one clutch may be active and the others may be inactive during operating conditions. When the first clutch 224 is active, power from the second shaft 220 rotates the first clutch gear 225. The first clutch gear 225 may include teeth that interlock with teeth of a fifth gear 244. When the second clutch 234 is active, power from the third shaft 230 rotates the second clutch gear 235. The second clutch gear 235 may include teeth that interlock with teeth of the fifth gear 244. When the third clutch 226 is active, power from the second shaft 220 rotates the third clutch gear 227. The third clutch gear 227 may include teeth that interlock with teeth of a sixth gear 246. When the fourth clutch 236 is active, power from the third shaft 230 rotates the fourth clutch gear 237. The fourth clutch gear 237 may include teeth that interlock with teeth of a seventh gear 248.

The fifth gear 244, the sixth gear 246, and the seventh gear 248 may be arranged on a fourth shaft 240. A low clutch 242 may be arranged on the fourth shaft 240. The low clutch 242 may include a low clutch gear 245. The fourth shaft 240 may rotate via power transferred from one of the fifth gear 244, the sixth gear 246, or the seventh gear 248. If the low clutch 242 is active, then the low clutch gear 245 may rotate and interlock with an eighth gear 256. If the low clutch 242 is inactive, then the low clutch gear 245 may not rotate with the fourth shaft 240. The fifth gear 244 may rotate and transfer power to a high clutch gear 254 of a high clutch 252. The high clutch 252 may be arranged on a fifth shaft 250.

Operation of the high clutch 252 and the low clutch 242 may be coordinated such that when one is active the other is inactive. Thus, if the low clutch 242 is active and the low clutch gear 245 is rotating and transferring power to the eighth gear 256, then the high clutch 252 may be inactive and the high clutch gear 254 may not rotate with the fifth shaft 250. If the low clutch 242 is inactive, then the high clutch 252 may be active and the high clutch gear 254 may rotate via power from the fifth gear 244. The high clutch gear 254 may rotate the fifth shaft 250, which rotates the eighth gear 256. The eighth gear 256 may include teeth that interlock with teeth of an output gear 262 arranged on an output shaft 260. The output gear 262 may spin the output shaft 260, wherein a first flange 264 is arranged on a first extreme end of the output shaft 260 and a second flange 266 is arranged on a second extreme end of the output shaft 260, the second extreme end opposite the first extreme end. In one example, a distance between the first flange 264 and the second flange 266 may be less than a determined distance.

The determined distance may be based on a width of a gear, such as one of the gears included in the transmission assembly 200. The distance between the first flange 264 and the second flange 266 may be reduced relative to other transmission layouts due to the reduced speeds experienced by the gears and bearings, which allows smaller shafts, gears, and bearings to be included in the transmission assembly 200. The first flange 264 and the second flange 266 may be coupled to different output members, such as wheels, axles, differentials, and the like.

Turning now to FIG. 3, it shows a transmission layout 300. The transmission layout 300 may include an entirety of the transmission assembly 200. The transmission layout 300 may further include a second prime mover 302. The second prime mover 302 may be an electric machine or an internal combustion engine. In one example, the first prime mover 202 is an electric machine and the second prime mover 302 is an electric machine. Additionally or alternatively, one of the first prime mover 202 or the second prime mover 302 may be an electric machine and the other may be an internal combustion engine.

The second prime mover 302 may include a second prime mover shaft 304 on which a second prime mover shaft gear 306 is arranged. The second prime mover 302 may transfer power to and rotate the second prime mover shaft 304. The second prime mover shaft gear 306 may rotate with the second prime mover shaft 304. The second prime mover shaft gear 306 may include teeth that interlock with teeth of the first gear 208. As such, each of the first prime mover 202 and the second prime mover 302 may provide power to the first gear 208.

In the transmission layout 300 and the transmission assembly 200, each of the shafts included therein may be parallel to one another. In some examples, additionally or alternatively, two or more of the shafts may be co-axial and share a common axis of rotation.

Turning now to FIG. 4, it shows a transmission housing 400. The transmission housing 400 may house the transmission assembly 200 or the transmission layout 300 without modifications to the shape or size of the transmission housing 400 as illustrated in FIG. 4. In this way, a single housing configuration may be configured to accommodate drivetrains configured with a single prime mover or multiple prime movers.

The transmission housing 400 may include a charging pump 402. The charging pump 402 may be mounted on the transmission housing 400. Additionally or alternatively, the charging pump 402 may be mounted on a location remote to the transmission housing 400.

The transmission housing 400 may further include an offset box 404 configured to couple to an electric machine at a location below a highest point of the transmission housing. The offset box 404 may further include a gearset configured based on the electric motor speed and desired transmission speeds. In one example, the gearset is an input reduction gearset. The offset box 404 may include two shaft bosses adjacent (e.g., neighboring) to one another that are shaped to receive prime mover shaft, such as the prime mover shaft 204.

Turning now to FIG. 5A, it shows a long drop transmission layout 500. The long drop transmission layout 500 may include a first distance 502 between the first shaft 210 and the output shaft 260. Circles indicate shafts and lines between the shafts illustrate a coupling between corresponding gears.

Turning now to FIG. 5B, it shows a short drop transmission layout 550. The short drop transmission layout 550 may include a second distance 552 between the first shaft 210 and the output shaft 260. The second distance 552 may be less than the first distance 502 of the long drop transmission layout 500 of FIG. 5A. Circles indicate shafts and lines between the shafts illustrate a coupling between corresponding gears.

The disclosure also provides support for a multi-speed transmission, comprising: an input section comprising a plurality of input speed reduction gearsets, an intermediate section comprising a plurality of clutches and gears configured to generate different speeds, and an output section comprising a high clutch and a low clutch, wherein each of the sections is arranged in the transmission housing, wherein a layout of the sections arranged in the transmission housing is in a short drop layout with a first distance between an input shaft of the input section and an output shaft of the output section or in a long drop layout with a second distance between the input shaft and the output shaft, wherein the second distance is greater than the first distance. In a first example of the system, a gear of at least one output shaft of a prime mover is coupled to a gear of the plurality of input speed reduction gearsets. In a second example of the system, optionally including the first example, the plurality of clutches is arranged on parallel shafts. In a third example of the system, optionally including one or both of the first and second examples, the system further comprises: a plurality of shafts on which the plurality of clutches and gears are arranged, wherein each of the plurality of shafts is parallel to a single axis. In a fourth example of the system, optionally including one or more or each of the first through third examples, the transmission housing is configured to receive output shafts from a first electric motor and a second electric motor. In a fifth example of the system, optionally including one or more or each of the first through fourth examples, gears of the output shafts are coupled to a same gear. In a sixth example of the system, optionally including one or more or each of the first through fifth examples, the system further comprises: a first output flange and a second output flange arranged on an output shaft driven by either the higher clutch or the low clutch.

The disclosure also provides support for a system, comprising: an electric motor comprising an electric motor output shaft, a transmission assembly, comprising: a second gear coupled to a first gear on the electric motor output shaft, the second gear arranged on a first shaft, a third gear arranged on a first shaft with the second gear, wherein the third gear is coupled to each of a fourth gear arranged on a second shaft and a fifth gear arranged on a third shaft, a plurality of clutches arranged on the second shaft and the third shaft, a fourth shaft comprising a sixth gear coupled to a first clutch or a second clutch of the plurality of clutches, a seventh gear coupled to a third clutch of the plurality of clutches, an eighth gear coupled to a fourth clutch of the plurality of clutches, and a low clutch, a fifth shaft comprising a high clutch coupled to the low clutch, and an output shaft comprising an output gear coupled to the high clutch. In a first example of the system, the system further comprises: a housing containing the transmission assembly. In a second example of the system, optionally including the first example, the housing comprises an offset box configured to couple to the electric motor at a location below a highest point of the housing. In a third example of the system, optionally including one or both of the first and second examples, the housing is configured to couple to an additional shaft of a different motor. In a fourth example of the system, optionally including one or more or each of the first through third examples, the electric motor output shaft, the first shaft, the second shaft, the third shaft, the fourth shaft, the fifth shaft, and the output shaft are parallel to one another. In a fifth example of the system, optionally including one or more or each of the first through fourth examples, the transmission assembly is configured in a long drop layout. In a sixth example of the system, optionally including one or more or each of the first through fifth examples, the transmission assembly is configured in a short drop layout. In a seventh example of the system, optionally including one or more or each of the first through sixth examples, the second gear is further coupled to a gear of a second electric motor output shaft of a second electric motor.

The disclosure also provides support for a system, comprising: a first electric motor comprising a first electric motor output shaft, a second electric motor comprising a second electric motor output shaft a transmission assembly, comprising: a second gear coupled to a first electric motor output shaft gear and a second electric motor output shaft gear, the second gear arranged on a first shaft, a third gear arranged on a first shaft with the second gear, wherein the third gear is coupled to each of a fourth gear arranged on a second shaft and a fifth gear arranged on a third shaft, a plurality of clutches arranged on the second shaft and the third shaft, a fourth shaft comprising a sixth gear coupled to a first clutch or a second clutch of the plurality of clutches, a seventh gear coupled to a third clutch of the plurality of clutches, an eighth gear coupled to a fourth clutch of the plurality of clutches, and a low clutch, a fifth shaft comprising a high clutch coupled to the low clutch, and an output shaft comprising an output gear coupled to the high clutch. In a first example of the system, a housing of the transmission assembly is coupled to the first electric motor output shaft and the second electric motor output shaft at neighboring locations on an offset box. In a second example of the system, optionally including the first example, the transmission assembly is configured in a short drop layout with a first distance between the first shaft and the output shaft or in a long drop layout with a second distance between the first shaft and the output shaft, wherein the second distance is greater than the first distance. In a third example of the system, optionally including one or both of the first and second examples, the plurality of clutches are wet clutches. In a fourth example of the system, optionally including one or more or each of the first through third examples, the first clutch and the third clutch are arranged on the second shaft and the second clutch and the fourth clutch are arranged on the third shaft.

As used herein, the term "approximately" is construed to mean plus or minus five percent of the range unless otherwise specified.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A multi-speed transmission, comprising:
   an input section comprising a plurality of input speed reduction gearsets;
   an intermediate section comprising a plurality of clutches and gears configured to generate different speeds; and
   an output section comprising a high clutch and an eighth gear arranged on a fifth shaft, a low clutch arranged on a fourth shaft, and an output gear arranged on an output shaft, wherein operation of the high clutch and the low clutch is coordinated such that, when the high clutch is active, the low clutch is inactive and, when the low clutch is active, the high clutch is inactive, wherein
   each of the sections is arranged in a transmission housing, wherein a layout of the sections arranged in the transmission housing is in a short drop layout with a first distance between an input shaft of the input section and the output shaft of the output section or in a long drop layout with a second distance between the input shaft and the output shaft, and wherein the second distance is greater than the first distance.

2. The multi-speed transmission of claim 1, wherein a gear of the fifth shaft is coupled to the output gear.

3. The multi-speed transmission of claim 1, wherein the plurality of clutches is arranged on parallel shafts.

4. The multi-speed transmission of claim 1, further comprising a plurality of shafts on which the plurality of clutches and gears are arranged, wherein each of the plurality of shafts is parallel to a single axis.

5. The multi-speed transmission of claim 1, wherein the transmission housing is configured to receive electric motor output shafts from a first electric motor and a second electric motor.

6. The multi-speed transmission of claim 5, wherein gears of the electric motor output shafts are coupled to a same gear.

7. The multi-speed transmission of claim 1, further comprising a first output flange and a second output flange arranged on the output shaft driven by either the high clutch or the low clutch.

8. A system, comprising:
   an electric motor comprising an electric motor output shaft;
   a transmission assembly coupled to the electric motor, comprising:
     a first gear coupled to an electric motor output shaft gear;
     a second gear arranged on a first shaft with the first gear, wherein the second gear is coupled to each of a third gear arranged on a second shaft and a fourth gear arranged on a third shaft;
     a plurality of clutches arranged on the second shaft and the third shaft;
     a fourth shaft comprising a fifth gear coupled to a first clutch or a second clutch of the plurality of clutches, a sixth gear coupled to a third clutch of the plurality of clutches, a seventh gear coupled to a fourth clutch of the plurality of clutches, and a low clutch;
     a fifth shaft comprising a high clutch coupled to the low clutch and an eighth gear, the eighth gear coupled to an output gear; and
     an output shaft comprising the output gear coupled to the high clutch via the eighth gear.

9. The system of claim 8, further comprising a housing containing the transmission assembly.

10. The system of claim 9, wherein the housing comprises an offset box configured to couple to the electric motor at a location below a highest point of the housing.

11. The system of claim 10, wherein the housing is configured to couple to an additional shaft of a different motor.

12. The system of claim 8, wherein the electric motor output shaft, the first shaft, the second shaft, the third shaft, the fourth shaft, the fifth shaft, and the output shaft are parallel to one another.

13. The system of claim 8, wherein the transmission assembly is configured in a long drop layout.

14. The system of claim 8, wherein the transmission assembly is configured in a short drop layout.

15. The system of claim 8, wherein the first gear is further coupled to a second electric motor output shaft gear of a second electric motor.

16. A system, comprising:
a first electric motor comprising a first electric motor output shaft;
a second electric motor comprising a second electric motor output shaft;
a transmission assembly, comprising:
a first gear coupled to a first electric motor output shaft gear and a second electric motor output shaft gear;
a second gear arranged on a first shaft with the first gear, wherein the second gear is coupled to each of a third gear arranged on a second shaft and a fourth gear arranged on a third shaft;
a plurality of clutches arranged on the second shaft and the third shaft;
a fourth shaft comprising a fifth gear coupled to a first clutch or a second clutch of the plurality of clutches, a sixth gear coupled to a third clutch of the plurality of clutches, a seventh gear coupled to a fourth clutch of the plurality of clutches, and a low clutch;
a fifth shaft comprising a high clutch coupled to the low clutch; and
an output shaft comprising an output gear coupled to the high clutch via an eighth gear.

17. The system of claim 16, wherein a housing of the transmission assembly is coupled to the first electric motor output shaft and the second electric motor output shaft at neighboring locations on an offset box.

18. The system of claim 16, wherein the transmission assembly is configured in a short drop layout with a first distance between the first shaft and the output shaft or in a long drop layout with a second distance between the first shaft and the output shaft, and wherein the second distance is greater than the first distance.

19. The system of claim 16, wherein the plurality of clutches are wet clutches.

20. The system of claim 16, wherein the first clutch and the third clutch are arranged on the second shaft and the second clutch and the fourth clutch are arranged on the third shaft.

* * * * *